(12) United States Patent
Rockwell

(10) Patent No.: US 9,378,356 B2
(45) Date of Patent: Jun. 28, 2016

(54) TWO FACTOR AUTHENTICATION USING A ONE-TIME PASSWORD

(75) Inventor: Paul Rockwell, Sunnyvale, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 13/447,092

(22) Filed: Apr. 13, 2012

(65) Prior Publication Data

US 2013/0276078 A1  Oct. 17, 2013

(51) Int. Cl.
  *G06F 21/00*  (2013.01)
  *G06F 21/43*  (2013.01)
  *H04L 9/32*   (2006.01)
  *H04L 29/06*  (2006.01)

(52) U.S. Cl.
  CPC .............. *G06F 21/43* (2013.01); *H04L 9/3228* (2013.01); *H04L 63/0846* (2013.01); *H04L 2463/082* (2013.01)

(58) Field of Classification Search
  CPC .............. H04L 63/083; H04L 63/0853; H04L 2463/082; H04L 9/3228; G06F 21/43
  USPC ......................................................... 726/7, 5
  See application file for complete search history.

(56) References Cited

U.S. PATENT DOCUMENTS

| 2006/0047847 | A1* | 3/2006 | Saccocio ........................ 709/235 |
| 2009/0254479 | A1* | 10/2009 | Pharris ............................ 705/42 |
| 2011/0178926 | A1 | 7/2011 | Lindelsee et al. |
| 2011/0185406 | A1* | 7/2011 | Hirson et al. ...................... 726/6 |
| 2012/0011066 | A1* | 1/2012 | Telle et al. ........................ 705/44 |
| 2012/0041879 | A1* | 2/2012 | Kim et al. ........................ 705/44 |

* cited by examiner

*Primary Examiner* — Jeffrey Pwu
*Assistant Examiner* — Thong Truong
(74) *Attorney, Agent, or Firm* — Haynes and Boone, LLP

(57) ABSTRACT

Methods and systems for online authentication eliminate the common username plus password combination, using instead a novel two-factor authentication that employs a mobile phone number and a one-time, limited life password. The user provides the mobile phone number to a login dialog and receives, from a service provider, the one-time password, e.g., via a text message, at the mobile device to which the phone number belongs. If the user enters the one-time password before it expires, the user is authenticated and logged in. A method for authentication or authorization to a website includes: receiving a phone number from a user via a communication network in response to a login prompt displayed to the user; transmitting a one-time password to the phone number using text messaging; and in response to receiving the one-time password back from the user, authenticating the user for transactions with the website.

20 Claims, 4 Drawing Sheets

TWO FACTOR AUTHENTICATION USING A ONE-TIME PASSWORD

BACKGROUND

1. Technical Field

Embodiments of the present invention generally relate to online commerce and social interactions conducted over a communication network such as the Internet and, more particularly, to authentication for secure communications, over the network, between service users and service providers, including secure account access and authorizations.

2. Related Art

Secure communication over the Internet between parties to a transaction (e.g., an online shopper and a merchant website, or a user of a social networking website and the social networking website) often relies on the user registering on the website and then logging in to the website using the familiar combination of a username and a password. The username-password login is one example of what is often referred to as single factor authentication. The factors of authentication typically include: "something you have" (e.g., mobile phone or hardware token), "something you know" (e.g., personal identification number (PIN) or password), and "something you are" (e.g., biometric information). In the online shopper example, an entity (the shopper, referred to as "end-user" or "user") that wants to assert a particular identity may communicate some authentication information to another entity (the merchant website, referred to as "relying party" or "service provider") that wants to verify the end-user's identity. Each service provider may provide their own system for login and authentication so that any particular user may need to register an identifier (e.g., username and password) at every service provider the user wishes to maintain an account or identity with.

OpenID is an open standard for authentication that allows users to consolidate their digital identities and eliminates the need for service providers to provide their own individual or ad hoc systems. OpenID may provide a user with one login for multiple sites. For example, a user may create accounts with one or more of the user's preferred OpenID identity providers, and then use those accounts as the basis for signing on to any website which accepts OpenID authentication. The OpenID standard provides a framework for the necessary communication between the identity provider and the OpenID relying party. An extension to OpenID—OpenID Attribute Exchange—facilitates the transfer from the OpenID identity provider to the relying party of certain user information, such as name and address, that may be requested by a relying party.

Similarly, OAuth is an open standard for authorization, complementary to, but distinct from OpenID, that allows users to share private information stored on one site with another site without having to compromise identity credentials. Typically, OAuth supplies a token that grants access to a specific site for certain user information for a specified period of time. This allows a user to grant a third party site access to their information stored with another service provider, without sharing their access permissions or the full extent of their data.

The OpenID protocol does not rely on a central authority to authenticate a user's identity. Moreover, neither service providers nor the OpenID standard may mandate a specific approach to authenticating users, allowing for various approaches including username-password, smart cards, or biometrics. OpenID typically, however, uses the familiar username and password authentication, which is prone to a number of disadvantages. For example, a quality password should have many characters which are a mix of upper, lower, punctuation, and special characters so that it is difficult to compromise. However, a good quality password is often difficult and time-consuming to type, is often forgotten (as various password requirements exist on various sites), and users are advised to use different passwords for different accounts (to further reduce the chance their accounts will be compromised). This is especially true on a mobile device using touch keypads that have various 'levels' of keypads for characters beyond simple alpha-numeric. These difficulties or "friction" perceived on the part of the user, however minor, may lead to certain compromises. For example, many users may be apt to use less than optimal passwords, and use them repeatedly, which can be vulnerable to many well-known types of attack, such as a dictionary attack (a script that systematically tries out commonly used passwords) or trying out passwords which relate to the user (e.g. name of child, spouse, pet, or important dates).

SUMMARY

According to one or more embodiments of the present invention, methods and systems for authentication eliminate the common username plus password combination, instead using a novel two-factor authentication that employs a mobile phone number and one-time, limited life password. The user provides the user's mobile phone number to login to a service provider's site, and receives a one-time password (e.g., via a text message) on the mobile device to which the phone number belongs. If the user enters the one-time password within its limited lifespan, the user is then logged into the service provider's site.

In one or more embodiments, a system includes: a processor configured to communicate over a network with a mobile device and with a website; and a data storage device including a computer-readable medium having computer readable code for instructing the processor, and when executed by the processor, performs operations including: receiving a phone number from a user via the network in response to a login prompt displayed to the user; transmitting a one-time password to the mobile phone associated with the phone number; and in response to receiving the one-time password from the user via the network, authenticating the user for transactions with the website.

In another embodiment, a method includes: receiving a phone number from a user via a network in response to a login prompt displayed to the user; transmitting a one-time password to the phone associated with the phone number; and in response to receiving the one-time password from the user via a network, authenticating the user for transactions with a website.

In a further embodiment, a computer program product comprises a non-transitory computer readable medium having computer readable and executable code for instructing a processor to perform a method that includes: receiving a phone number from a user via a network in response to a login prompt displayed to the user; transmitting a one-time password to a phone associated with the phone number; and in response to receiving the one-time password from the user via the network, authenticating the user for transactions with the website.

DETAILED DESCRIPTION

Figure 1:
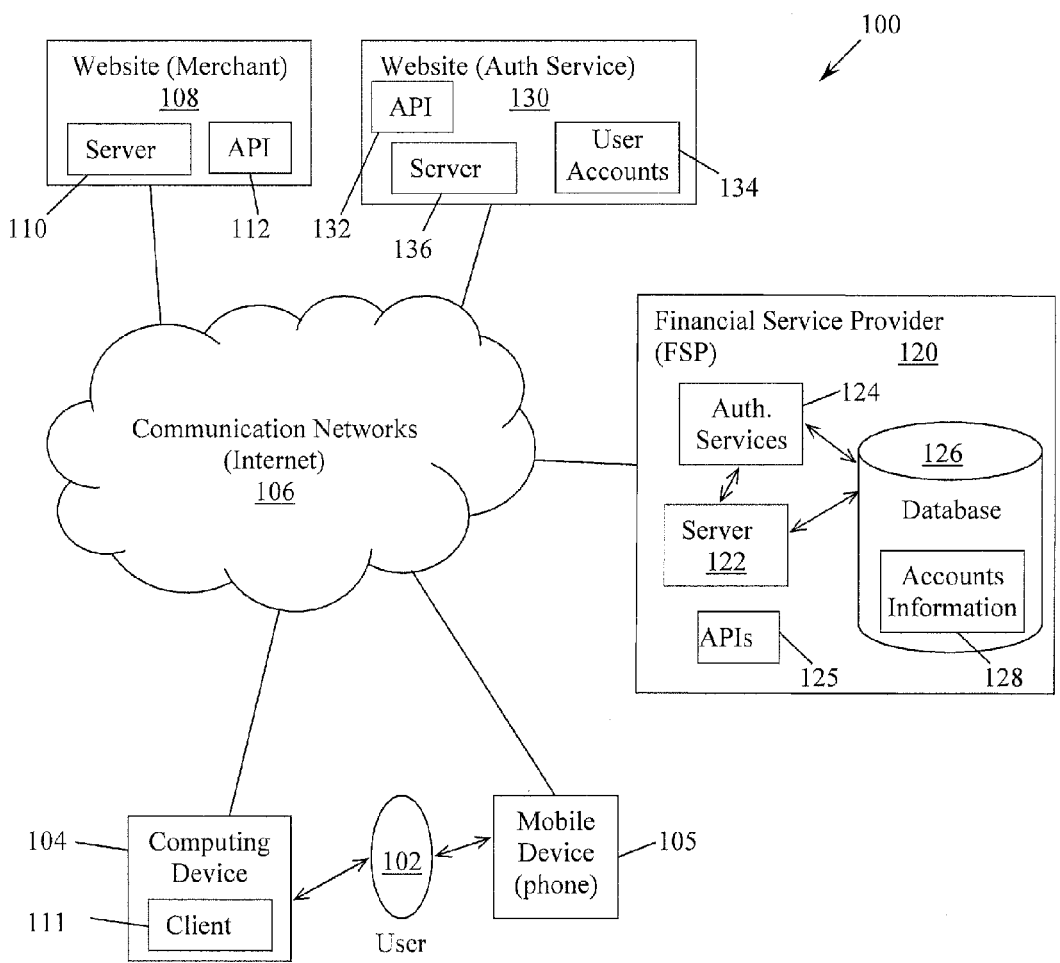
FIG. 1 is a system diagram illustrating a system for providing authentication services in accordance with an embodiment of the present invention.

Embodiments of the present invention provide a two-factor authentication that replaces the commonly used username and password authentication with the user's phone number and transmission to the user's phone of a limited life, one-time password, which, for example, could be as simple as a personal identification number (PIN) or more elaborate such as a random string of upper and lower case characters, numbers, and special characters. Briefly, from the user's perspective, the user goes to an online website (e.g., a merchant or service provider) and logs in by entering the phone number for a mobile device the user has at hand, the user promptly receives a message on the mobile device containing the one-time password, enters the one-time password to the online log in before it expires, and is then logged in to the online website. Limited information (already selected by the user) may be shared with the online website, for the purposes of user preferences, tracking, and order management.

Embodiments provide a two-factor authentication that is easier to use, and therefore, more secure than the typical username-password authentication, because, for example, most people will remember their phone number and the one-time password need not be remembered as it is sent to the user in near real time and must be used within a very short lifespan before it expires. Thus, embodiments alleviate common difficulties with users having to remember a multitude of arbitrary usernames and corresponding passwords, which are often forgotten. Elimination of the "friction" described above, making embodiments more readily used and more reliable, for example, may further enhance the security of authentication provided by one or more embodiments so as to mitigate or eliminate the problem of "account takeover" experienced by service providers, in which a user's account may be fraudulently used by an unauthorized person who manages to guess or break the username-password security of an account owned by the user. Such services may include, for example, an online payment service operating between consumers and merchants and may be a service provided by a financial service provider (FSP)—such as PayPal, Inc. of San Jose, Calif.—in which a user of the service may have an account with the FSP (referred to as an "FSP account).

Embodiments may also provide convenient (e.g., one-stop login or use of a favorite login provider for use with multiple merchants and websites) authentication and authorization services such as those provided by OpenID and OAuth. Embodiments may provide an added level of security compared to OpenID and OAuth, however, because the operational models of OpenID and OAuth, and similar standards, may be described as hub-and-spoke, where the OAuth or OpenID account is the hub, and all related accounts are the spokes. If the hub is compromised (for example, via a weak password, phishing, or malware) then the spokes are also compromised. With the new mechanism for authentication provided by one or more embodiments, there is little opportunity for compromise.

FIG. 1 illustrates a system 100 for online commerce according to one embodiment. A user 102 (generally a consumer or consumer user of FSP services) may communicate via a computing device 104 (e.g., a computer, cell phone, computing tablet, or other consumer electronic device) with financial service provider (FSP) 120 via communication networks 106, which may include the Internet as well as phone networks such as Public Switched Telephone Network (PSTN). User 102 may also communicate over communication networks 106 using a mobile device 105, e.g., a mobile phone of any kind, that can receive messages such as Short Message Service (SMS) messages. User 102 may also communicate via network 106 with a website 108 that may be a merchant website that is a seller of retail goods, for example. Merchant website 108 may sell goods online and may communicate with user 102, for example, by operating a server 110 (e.g., a computer processor) that presents a website for selling goods. The server 110 may respond responding to client devices (e.g., client 111 running on device 104) by communicating over network 106. In general, for purposes of embodiments described herein, computing device 104 and mobile device 105 need not be separate devices, although they can be, and may be the same device such as embodied by a smart phone, for example.

Merchant website 108 may also communicate (for example, using server 110) with FSP 120 through FSP server 122 over network 106. For example, merchant website 108 may communicate with FSP 120 in the course of various services offered by FSP 120 to merchant website 108, such as payment intermediary between customers (e.g., consumer user 102) of merchant website 108 and merchant website 108 itself. For example, merchant website 108 may use an application programming interface (API) 112 that allows it to offer sale of goods in which customers are allowed to make payment through FSP 120, while consumer user 102 may have an account with FSP 120 that allows consumer user 102 to use the FSP 120 for making payments to sellers that allow use of authentication, authorization, and payment services 124 of FSP 120 as a payment intermediary. Also as shown in FIG. 1, FSP 120 may provide electronic data storage in the form of database 126. Database 126 may be used to keep track of user's accounts 128 with FSP 120, merchant's accounts with FSP 120, and transactions between customers, merchants, and stores including payments between the various entities, for example. FSP server 122 may execute various application programming interfaces (APIs) that may enable various different types of relationships between FSP 120 and the different parties shown in FIG. 1. In addition, FSP may provide various APIs 125 to its customers such as website 108 (e.g., API 112) and website 130 (e.g., API 112) that enable those websites to implement embodiments of authentication, authorization, and password reset services.

Website 130 may be a website that provides authorization services that enable a user (e.g., user 102) to login to other websites and services while only having to maintain one user account 134 at the authorization services website 130. For example, such an arrangement may be provided according to the OpenID and OAuth standards. Website 130 may communicate with FSP 120 and user 102, for example, over communication network 106 via server 136. Website 130 may offer authentication and authorization services through use and customization of an API 132 which may be provided by FSP 120. For example, FSP 120 may provide an API 125 that is customizable to become API 132. Similarly, merchant website 108 may offer authentication and authorization services through use and customization of an API 125 that is customizable to become API 112 provided by FSP 120.

Figure 2:
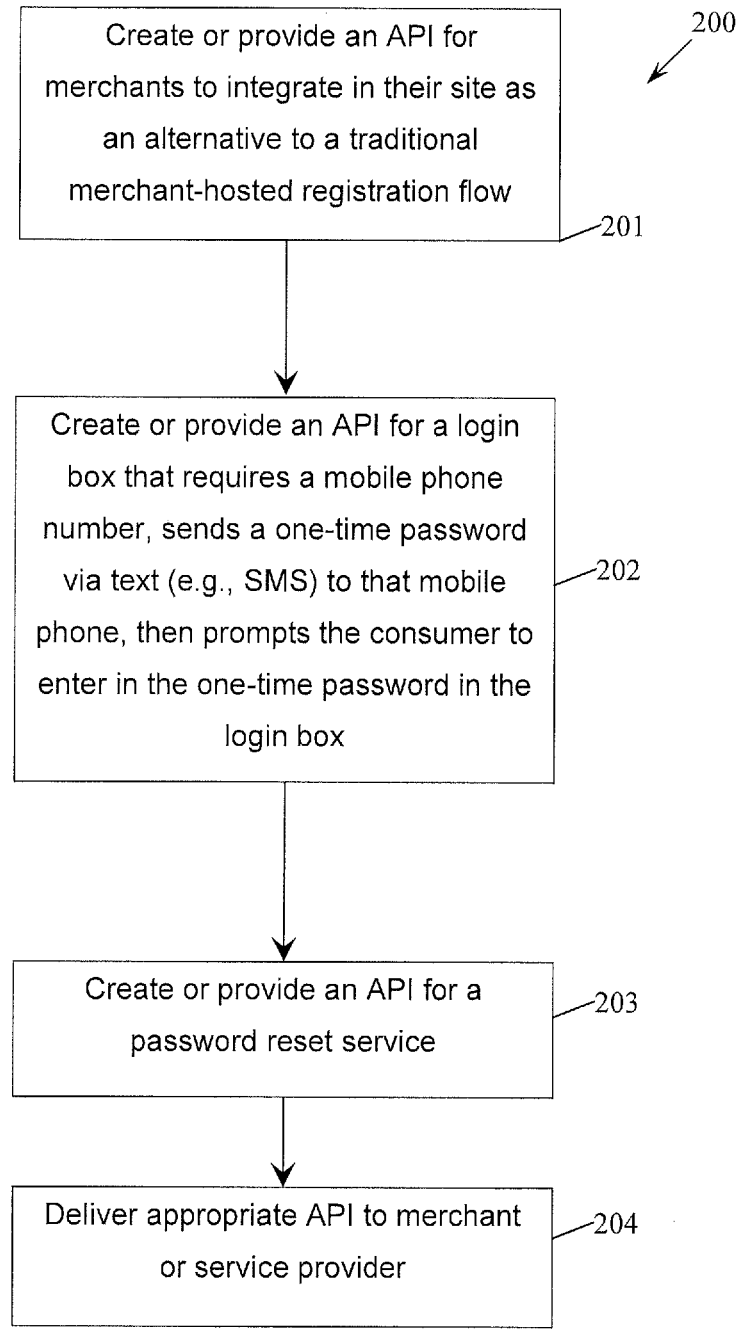
FIG. 2 is a flow chart illustrating a method for providing authentication services in accordance with an embodiment.

FIG. 2 illustrates a method 200 for providing authentication services. In one embodiment a financial service provider may create (or otherwise provide) a series of API's for registration, login, or password reset (not all APIs may be needed by all customers, e.g., merchant websites or service providers).

At step 201, a service provider (e.g., FSP 120) may provide an API (e.g., one of APIs 125) for registration to one of its commercial customers (e.g., merchant website 108 or authentication services website 130) that, when customized by the customer, e.g., merchant website 108, may implement a merchant-customized registration flow (a web flow or exchange of communication between the website and a user, e.g., user 102, of the website) that at the least gathers and verifies the user's mobile number. The merchant may integrate the API into the merchant's website as an alternative to a traditional merchant-hosted registration flow.

At step 202, a service provider may provide an API for user login that when, customized by the customer, e.g., website 108 or 130, may implement a login web flow. For example, the customized API (e.g., API 112 or 132) may implement a login dialog box—which may displayed from the merchant website 108, a website of FSP 120 or an authentication website 130 upon redirect, for example—that requires a mobile phone number, sends a one-time password via SMS to that mobile phone (by using the phone number sends the one-time password to the phone having that phone number), then prompts the consumer to enter in the one-time password. Once completed, the consumer user (e.g., user 102) may be authenticated and directed to the merchant website, e.g., website 108.

At step 203, a service provider may provide an API for user password reset (e.g., for conventional username-password authentication processes) that when, customized by the customer, e.g., website 108 or 130, may implement a customer-customized web flow. The password reset API could be useful for customers not wishing to use the registration or login API for one-time password authentication and preferring to stay with a more conventional username-password authentication process. For example, the customized API (e.g., API 112 or 132) may implement a web flow for helping consumer users (e.g., user 102) reset passwords based on mobile phone numbers in their profile. In use, a consumer may enter the consumer's existing username (e.g. email address is commonly used) and a phone number in a dialog box or separate frame of the webpage (e.g., an iframe could be used). The password reset API may then send, in response, a one-time password in a text message to the consumer's mobile phone via SMS, and the consumer would enter that one-time password back in the iframe. Once the consumer is authenticated, the password reset API would send a new password via SMS to the consumer, and notify the merchant of the new password. The merchant can present a "change your password" flow of its own choosing at this point.

At step 204, a service provider (e.g., FSP 120) may deliver an appropriate API (e.g., one of APIs 125) to its customer, e.g., merchant website 108 or authentication service provider (login host website) 130. The API may be customized either before or after delivery.

Figure 3:
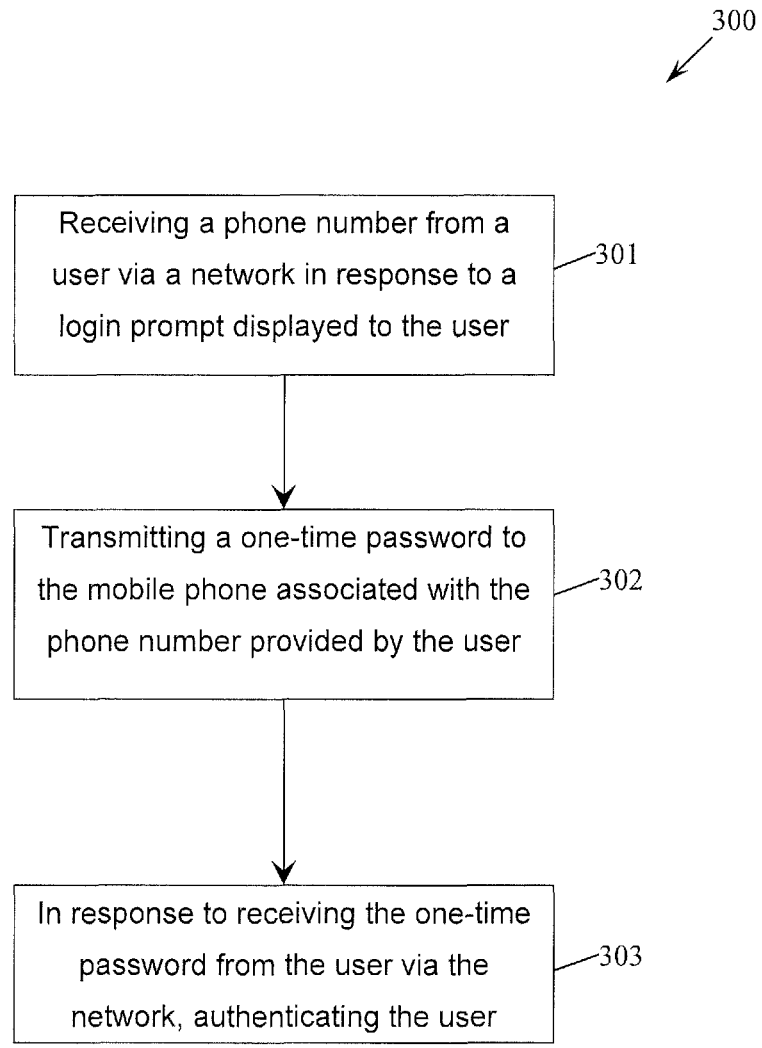
FIG. 3 is a flow chart illustrating a method for using authentication services in accordance with an embodiment.

FIG. 3 illustrates a method 300 for using authentication services in accordance with an embodiment.

At step 301, a service provider (e.g., FSP 120 or login host website 130) may receive a phone number from a user 102 via the network 106 in response to a login prompt displayed to the user 102. For example, the user 102 may go to the merchant website 108 from any device (e.g., computing device 104 or mobile device (phone) 105) and clicks "Sign in" (e.g., the displayed login prompt). It doesn't matter what device user 102 signs in from (e.g., computing device 104 or mobile device (phone) 105) because the session would eventually time out, and the one-time password that will be provided to and used by user 102 may prevent the same credentials from being used again later for another session.

In an example of user 102 shopping on a merchant website 108, a number of login options may be provided.

In a first login option example, FSP 120 may host the login. The FSP 120 may provide computer code (e.g., an API 125) to the merchant website 108, which the merchant website 108 may place on their website (similar to experience with OpenID or OAuth) for their customers to log in. Once the customer completes the login session, the FSP 120 may pass certain information (e.g., from accounts information 128) such as email address and user identification so that the merchant website can track information (e.g., preferences, items in cart) about this particular customer, consumer user 102.

In a second login option example, the user 102 can choose one of many optional login hosts. Some merchants (e.g., merchant website 108) present customers with multiple options for logging in, based on accounts at companies the customer may already do business with, and which, importantly, they trust. For example, large companies or ones with a well-known web presence that offer their own login accounts. Similar to the first login option example, once the customer completes the login session via the chosen login host (e.g., using method 300 at login host website 130), FSP 120 may pass certain information (e.g., email address and user identification) to the merchant website 108 so the merchant can track information (e.g., preferences, items in cart) about this particular customer, consumer user 102.

In a third login option example, the merchant could have its own login dialog, but also offer an alternative for the FSP 120 login such as an additional button to click.

Regardless of login option chosen, user 102 may enter the mobile phone number of the user's mobile device (e.g., phone number for mobile device 105). For example, the user may enter the user's mobile device phone number in the field that asks for it and click "submit".

At step 302, in the background and in response to receiving the phone number, FSP 120 may match the phone number to an FSP account (e.g., using database 126 and accounts information 128). On finding a match, FSP 120 may generate a one-time password, set a pre-defined expiration period for the one-time password, and send the one-time password to the phone number (e.g., to the mobile device having that phone number such as mobile device 105). The expiration period gives the one-time password a finite lifespan, e.g., a few minutes, after which the one-time password expires, meaning that it is no longer valid and the authentication process will not be continued, regardless of whether or not the one-time password has been correctly entered. Also, for example, on finding a match, if the user's FSP account is suspended or under some other restriction, FSP 120 may provide a dialog to user 102 that explains the next steps for that user.

At step 303, user 102 may enter the one-time password (by entering in the proper field in the dialog or web flow provided, for example, and clicking submit). In response to receiving the one-time password from the user 102 via the network 106 before the expiration period for the one-time password passes or runs out, the user 102 is now logged in (e.g., authenticated) and may start shopping, for example, on the merchant website 108. Because the login module (e.g., the login dialog and exchange of information with user 102) is hosted by the FSP 120, only FSP 120 (e.g., server 122, database 126) needs to look for the correct one-time password to be received and the one-time password does not need to be sent to the merchant website 108. If the user 102 fails to enter the correct one-time password, FSP 120 may provide a dialog that either prompts the user 102 to enter the one-time password again or provides an option like "click to resend one-time password". Once user 102 enters in the correct one-time password, FSP 120 may pass certain data elements to the merchant website 108 so that it can track the session, information, and preferences of user 102 for the merchant website's product, service, or company.

For example, by logging in with FSP 120, one of the data elements shared with merchant website 108 may be a unique identifier generated by the FSP—e.g., a random string such as "123a4b56c789d"—that represents the user's (e.g., user 102) FSP account. With the FSP-unique identifier, the merchant website 108 may be able to associate any number of different things (e.g., display preferences, items in the user's cart, favorite items, wish lists) with the user's FSP-unique identifier. The merchant website 108 may store this associated information as profile information, but the user (e.g., user 102) will not need to know anything other than the user's mobile number (and the one-time password just received) in order to log in to the merchant website (for example, the user does not need a merchant website username and password combination). Thus, the user may be relieved of many of the problems and difficulties discussed above and may experience very little "friction" (as defined above) for logging in to the merchant website. The login process may still, however, provide the merchant website with the information it desires to have about the user (e.g., user 102) who is logging in using method 300.

Figure 4:
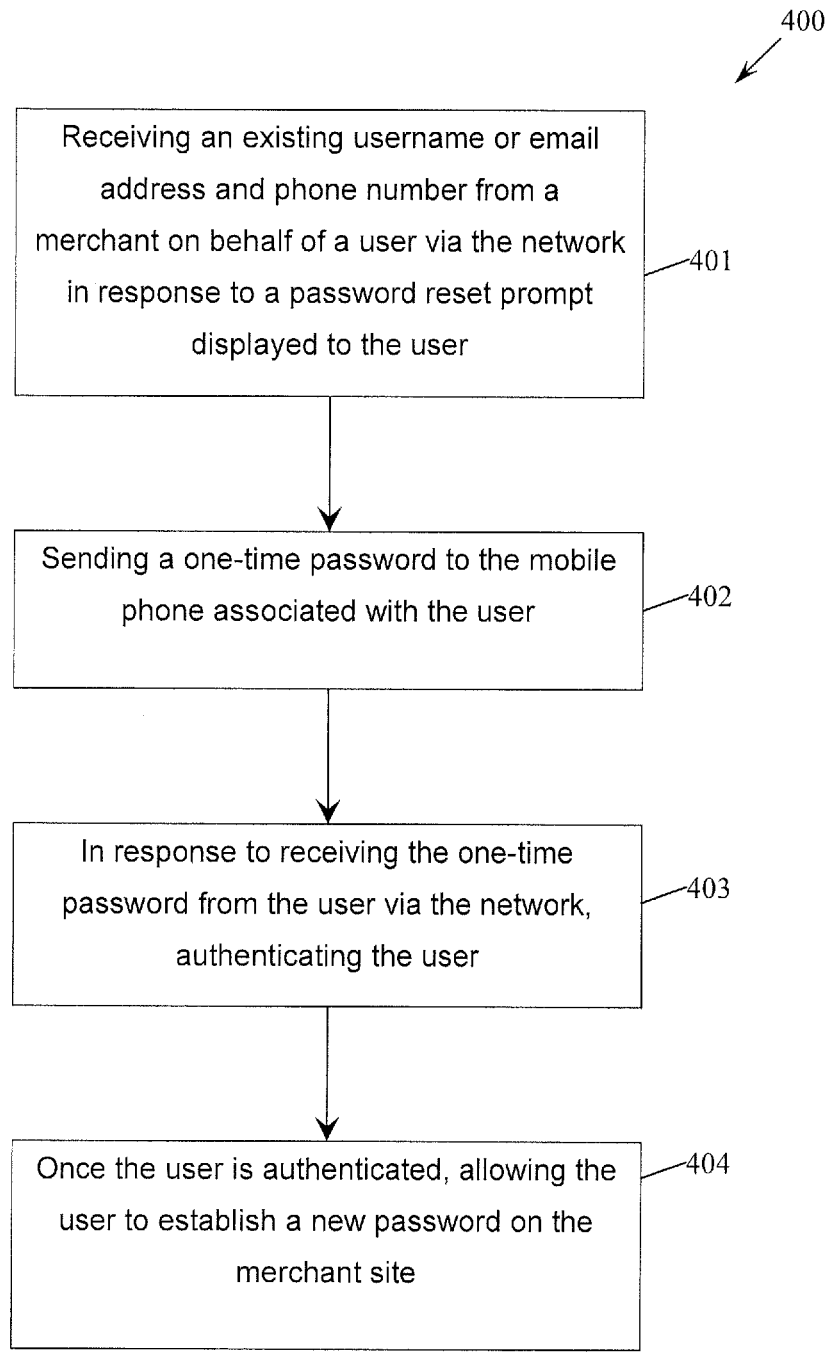
FIG. 4 is a flow chart illustrating a method for providing authentication for resetting passwords in accordance with an embodiment.

FIG. 4 illustrates a method 400 for providing authentication for resetting passwords in accordance with an embodiment. At step 401, an operator of a customized API for resetting passwords (e.g., FSP 120, merchant website 108, or login host website 130) may receive an existing username or email address and phone number from, for example, a merchant on behalf of a consumer user 102 via the network 106 in response to a password reset prompt displayed to the user 102. For example, operator FSP 120 may provide a web flow for helping consumer users (e.g., user 102) reset passwords based on mobile phone numbers in their profile (e.g., accounts information 128). The consumer 102 may enter the consumer's existing username (e.g. email address is commonly used) and a phone number in a dialog box or separate frame of the webpage.

At step 402, continuing with the same example, FSP 120 may send, in response to receiving the username and password, a one-time password (having a pre-defined lifespan or expiration period, after which the one-time password is no longer valid for authentication) in a text message, using the phone number (e.g., to the device associated with the phone number), to the consumer user's (user 102) mobile device. The consumer may be expected to then enter that one-time password back into the dialog box or separate frame of the webpage. At step 403, in response to receiving the one-time password back from the user 102 via the network 106, the user may be authenticated, e.g., transactions and operations requiring authentication or authorization may now proceed.

At step 404, once the consumer user 102 is authenticated, the FSP 120 may (by executing the password reset API) may either allow the user to establish a new password on the merchant website or send a new password (for use with the username) in a text message (e.g., via SMS) to the consumer user 102, and notify the customer (e.g., merchant website 108) of the new password. The merchant website 108 may present a "change your password" flow at this point. The "change your password" flow may have been chosen, designed, or customized by the merchant website to suit its wishes.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a non-transitory memory storing machine-readable data; and
one or more hardware processors coupled to the non-transitory memory and configured to communicate over a network with a mobile device of a user and with a plurality of websites and configured to read instructions from the non-transitory memory to cause the system to perform operations comprising:
displaying a login prompt to the user at a merchant website from the plurality of websites;
receiving a phone number from the user having an account with a financial service provider (FSP), via the network, in response to the login prompt;
transmitting a one-time password to a mobile phone using the phone number; and
in response to only receiving the one-time password from the user via the network,
authenticating, by the FSP, the user with the merchant website;
sharing, with the merchant website, profile information about the user from the user's account with the FSP, including a unique identifier generated by the FSP that represents the user's account with the FSP, wherein the profile information is associated with the unique identifier generated by the FSP;
logging the user directly into the merchant website based on the profile information and the unique identifier; and
logging the user, from the merchant website, into a second website of the plurality of websites based on the profile information and the unique identifier without further use of the one-time password or phone number.

2. The system of claim 1, wherein the one-time password is not sent to the merchant website.

3. The system of claim 1, wherein the login prompt is displayed on a login host website.

4. The system of claim 1, wherein the one-time password has predefined expiration period, after which the processor does not authenticate the user in response to receiving the one-time password.

5. The system of claim 1, wherein receiving the phone number comprises receiving the phone number via the network from a device displaying the login prompt.

6. The system of claim 1, wherein the one-time password is transmitted using short message service (SMS) texting to a device having the phone number.

7. The system of claim 1, wherein receiving the one-time password comprises receiving the one-time password via the network from a device displaying the login prompt.

8. The system of claim 1, wherein receiving the one-time password comprises receiving the one-time password via the network from a phone to which the one-time password was transmitted.

9. A method comprising:
displaying a login prompt to a user at a merchant website;
receiving a phone number from the user having an account with a financial service provider (FSP), via a network, in response to the login prompt;
transmitting a one-time password using the phone number; and
in response to only receiving the one-time password from the user via the network,
authenticating, by the FSP, the user with the merchant website;
sharing, with the merchant website, profile information about the user from the user's account with the FSP, including a unique identifier generated by the FSP that represents the user's account with the FSP, wherein the profile information is associated with the unique identifier generated by the FSP;
logging the user directly into the merchant website based on the profile information and the unique identifier; and
logging the user, from the merchant website, into a second website based on the profile information and the unique identifier without further use of the one-time password or phone number.

10. The method of claim 9, wherein the one-time password is not sent to the merchant website.

11. The method of claim 9, further comprising displaying the login prompt on a login host website.

12. The method of claim 9, further comprising:
setting an expiration period for the one-time password, wherein:
after the expiration period has passed, authentication of the user fails.

13. The method of claim 9, wherein receiving the phone number comprises:
receiving the phone number via the network from a device displaying the login prompt.

14. The method of claim 9, wherein receiving the one-time password comprises:
    receiving the one-time password via the network from a device displaying the login prompt.

15. A non-transitory machine-readable medium having stored thereon machine-readable instructions executable to cause a machine to perform operations comprising:
    displaying a login prompt to a user at a merchant website;
    receiving a phone number from the user having an account with a financial service provider (FSP), via a network, in response to the login prompt;
    transmitting a one-time password using the phone number; and
    in response to receiving only the one-time password from the user via the network,
        authenticating, by the FSP, the user with the merchant website;
        sharing, with the merchant website, profile information about the user from the user's account with the FSP, including a unique identifier generated by the FSP that represents the user's account with the FSP, wherein the profile information is associated with the unique identifier generated by the FSP;
        logging the user directly into the merchant website based on the profile information and the unique identifier; and
        logging the user, from the merchant website, into a second website based on the profile information and the unique identifier without further use of the one-time password or phone number.

16. The non-transitory machine-readable medium of claim 15 wherein
    the one-time password is not sent to the merchant website.

17. The non-transitory machine-readable medium of claim 15 further comprising machine-readable instructions executable to cause the machine to perform operations comprising:
    displaying the login prompt on a login host website.

18. The non-transitory machine-readable medium of claim 15 further comprising machine-readable instructions executable to cause the machine to perform operations comprising:
    setting an expiration period for the one-time password, wherein:
    after the expiration period expires, the processor does not authenticate the user in response to receiving the one-time password.

19. The non-transitory machine-readable medium of claim 15 further comprising machine-readable instructions executable to cause the machine to perform operations comprising:
    transmitting the one-time password using short message service (SMS) texting to a device having the phone number.

20. The non-transitory machine-readable medium of claim 15 further comprising machine-readable instructions executable to cause the machine to perform operations comprising:
    receiving the one-time password via the network from a phone to which the one-time password was transmitted.

* * * * *